United States Patent

Clerc et al.

[15] 3,662,233

[45] May 9, 1972

[54] SEMICONDUCTOR AVALANCHE DIODE

[72] Inventors: Denis Clerc, Wettingen; Dieter Zahn, Baden, both of Switzerland

[73] Assignee: Aktiengesellschaft Brown, Boveri & Cie, Baden, Switzerland

[22] Filed: June 16, 1969

[21] Appl. No.: 833,386

[30] Foreign Application Priority Data

July 22, 1968 Switzerland ..........................10977/68

[52] U.S. Cl...................317/235 T, 317/235 T, 317/235 AA, 317/235 AL

[51] Int. Cl...........................................................H01l 5/00

[58] Field of Search..................................................317/235

[56] References Cited

UNITED STATES PATENTS

| | | | |
|---|---|---|---|
| 3,370,209 | 2/1968 | Davis et al. | 317/235 |
| 3,417,299 | 12/1968 | Dixon et al. | 317/234 |
| 3,514,846 | 6/1970 | Lynch | 29/572 |
| 3,507,714 | 4/1970 | New et al. | 148/186 |
| 3,456,167 | 7/1969 | Biard | 317/234 |
| 3,337,783 | 8/1967 | Stehney | 317/235 |

*Primary Examiner*—John W. Huckert
*Assistant Examiner*—E. Wojciechowicz
*Attorney*—Pierce, Scheffler & Parker

[57] ABSTRACT

A p+ p n n+ semiconductor diode comprises a disc of semiconductor material such as silicon with a bevelled edge, a carrier plate of molybdenum in contact with the outer, p+ zone and an axially centered annular electrode in contact with an annular n+ region of the n-doped zone. The radius of the opening within the annular electrode and the underlying n+ region is greater than that of a central cylindrical region of the semiconductor material which has the minimum specific resistance of the overall disc material, and the annular region of the semiconductor material which lies between the central cylindrical region of lowest specific resistance and the inner boundary of the annular n+ region has a resistance characteristic such that when a current flows through such annular region at which no destruction of the semiconductor material yet occurs in the event of avalanche breakdown, the voltage drop which is produced is equal to the difference between the breakdown voltage in the central region of lowest resistance where avalanche breakdown is started and the means breakdown voltage in the remaining part of the semiconductor disc.

2 Claims, 2 Drawing Figures

Inventors

Figure 1:
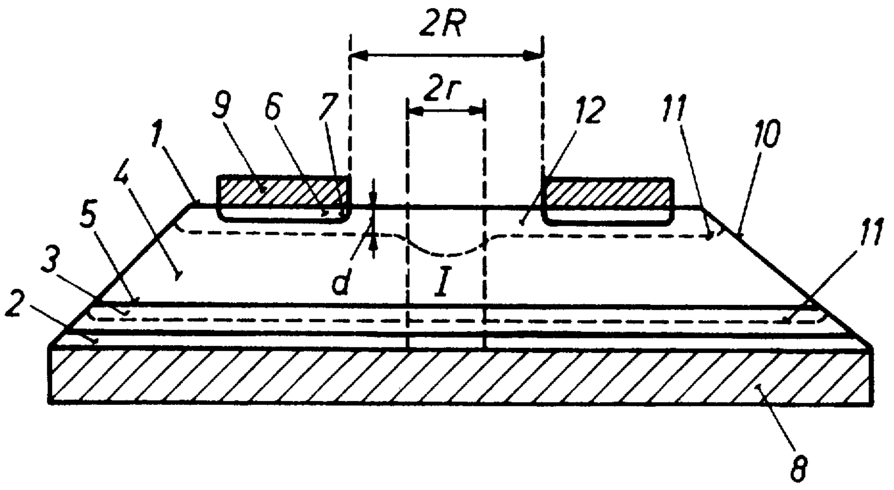

Denis Clerc
Dieter Zahn

By Pierce, Scheffler & Parker
Attorneys

SEMICONDUCTOR AVALANCHE DIODE

This invention relates to semiconductor elements and more particularly to an improved construction for a shock potential-resistant semiconductor diode which includes a disc of semiconductor material having a p-n junction and which is contacted at both sides with large surfaced electrodes and in which the specific resistance of the semiconductor disc varies along its front faces.

Semiconductor diodes are generally considered shock potential-resistant if their power loss in the case of an avalanche breakdown in the blocking direction is at least approximately equal to the power loss of the diodes in their current-carrying direction. This theoretical ideal is not, however, achieved in practice. The reason for this different behavior characteristic of the diode from the assumed theoretical is due to the fact that the doping inside of the crystal rods, from which the semiconductor discs for these diodes are produced, is not constant, but rather varies in a direction perpendicular to the growth axis of the crystal rod, a doping maximum appearing generally in a region along the rod axis which corresponds to a minimum of the specific resistance of the semiconductor material.

The inhomogeneity in the doping, which appears particularly in crystals having a relatively large diameter e.g. 20 millimeters and more, has the result that when a voltage is applied to the diode in the blocking direction, a space charge is formed whose thickness is the least at the points of minimum specific resistance of the semiconductor material so that the maximum electrical field strength is highest at that location. The avalanche breakdown is therefore started at those points where the points of highest electrical field strength exist, the breakdown current flowing at least at the start of the avalanche breakdown, as was found to be the case experimentally, over that range of the semiconductor disc in which the specific resistance of the material from which the semiconductor disc is made is at least approximately equal to its minimum value. Because of the relatively high current densities which appear at least temporarily, the semiconductor disc may have already been effectively made unfit for further use, even at a relatively low breakdown current.

The present invention is directed to a solution of the problem of providing a shock potential-resistant semiconductor diode structure wherein local overheating of the semiconductor disc is, to a great extent, avoided in the case of an avalanche breakdown, despite a condition where inhomogeneous doping of the semiconductor material, from which the diode is made, exists.

In accordance with the invention, a solution to the problem is provided wherein at least one of the electrodes includes an opening through the center and there being a highly doped zone of essentially the same configuration as the electrode within which a region of the semiconductor material exists which has its minimum specific resistance value, the semiconductor zone at that part of the electrode opening which is outside the space charge zone before avalanche breakdown occurs and located between the edge of the electrode opening and the edge of the region of semiconductor material having the minimum specific resistance value and where avalanche breakdown is started, having a resistance in which a current $I_m$ flowing through this region at which no destruction of the semiconductor material occurs yet, can produce a voltage drop $\Delta U_m$ which is equal to the difference $\Delta U_D = U_{D2} - U_{D1}$, where $U_{D1}$ is the breakdown voltage in the region in which the avalanche breakdown is started, and $\Delta U_{D2}$ is the mean breakdown voltage in the remaining part of the semiconductor disc.

Figure 2:
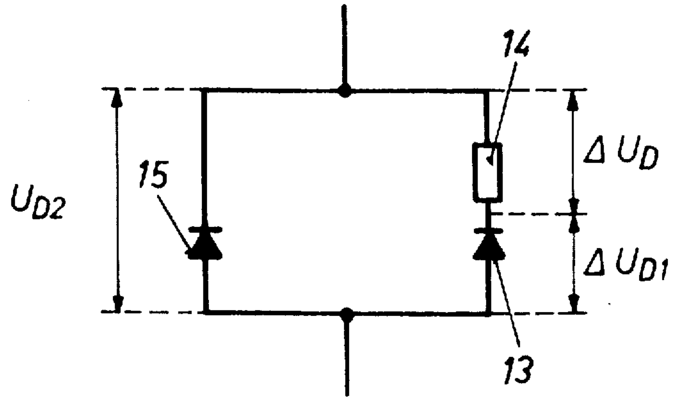

The invention will be described hereinafter in further detail with respect to a preferred embodiment thereof and which is illustrated in the accompanying drawings where:

FIG. 1 is a view in vertical central section of the improved semiconductor diode structure, the thickness of the disc, in particular, being greatly exaggerated in order to show the various zones of the disc more clearly; and FIG. 2 is an equivalent circuit diagram for the semiconductor structure shown in FIG. 1 to illustrate the mechanism of current distribution which takes place through different regions of the semiconductor structure.

With reference now to FIG. 1, the active part of the semiconductor diode includes a generally circular disc 1 of monocrystalline silicon, which is produced from a weakly doped rod-shaped single crystal of silicon which has a doping maximum in the proximity of its longitudinal axis. This rod-shaped silicon crystal is cut along planes perpendicular to its axis to form thin silicon wafers or discs which are to form the diodes, and these silicon discs exhibit their minimum specific resistance in the central region I of maximum doping indicated on FIG. 1. The limit of this central region I is defined by radius $r$ and is therefore seen to have a circular cylindrical configuration, and the specific resistance of the semiconductor material, i.e. the silicon outside this region is from 1.00 to 1.03 fold of its minimum value.

The p+ - p - n - n+ structure of the semiconductor disc consists of a highly doped p+ zone 2 (more than $10^{16}$ acceptor atoms/cm³), an adjoining weakly doped p zone 3 (less than $10^{16}$ acceptor atoms/cm³) which forms with a following weakly doped n zone 4 ($10^{13}$–$10^{16}$ donor atoms/cm³) in which the semiconductor material remains unchanged, a p-n junction 5, and finally an annular shaped, highly doped n+ zone 6 (more than $10^{16}$ donor atoms/cm³) whose inner peripheral edge 7 circularly surrounds with the radius R, and concentrically, the region I of minimum specific resistance of the semiconductor material.

The semiconductor disc 1 is provided on its highly doped p+ zone 2 with a carrier plate 8 of molybdenum which serves as one electrode, and is also provided on its annular shaped highly doped n+ zone 6 with a large surfaced annular electrode 9 which is centered with respect to the axis of the disc 1 and region I and the n+ zone 6. In the illustrated embodiment, the annular n+ zone 6 and the annular electrode 9 have the same inner and outer diameters. The disc 1 also has its edge 10 bevelled along a frusto-conical contour, the base of the bevel being adjacent the carrier plate 8. For use as a semiconductor diode, the active part of the semiconductor disc is contacted for example in the usual manner by terminal electrical connections and is located within a gas-tight housing.

The mode of operation of the semiconductor diode with an active semiconductor part in accordance with the construction depicted in FIG. 1, is as follows:

When a voltage is applied in a blocking direction between electrode 9 and carrier plate 8, a space charge zone is formed shortly before an avalanche breakdown occurs at both sides of the p-n junction within the disc. The upper and lower limits of this space charge zone are depicted by the broken lines 11 in the figure, and the space charge zone is defined as a region in which the electric field strength is greater than 1 kV/cm. From the minimum of the specific resistance of the semiconductor material in the center of the semiconductor disc, hence the n-doped zone 4 in which the doping of the base material was not changed, it follows that the thickness of the space charge zone is smaller in the central region than in the other regions. This is indicated by the dip in the line 11. As was determined experimentally, the voltage $U_D$ at which avalanche breakdown occurs, is approximately proportional to the specific resistance $\rho$ in the n-doped zone 4 in which the major part of the space charge zone is located.

With rising voltage in the blocking direction, the conditions for onset of avalanche breakdown will thus be reached first where in the n-doped zone 4, the specific resistance $\rho$ has a minimum value. Experience has shown that the breakdown current is at first confined to region I in which the specific resistance of the weakly n-doped zone 4 is about a 1.00 to 1.03 fold of its minimum value. The breakdown current flowing over the region I produces, in the disc shaped partial zone 12 of the weak n-doped zone 4, which is outside the space charge zone, a voltage drop $\Delta U$ between the circular cylindrical region I with radius $r$, and the circular inner edge 7 with radius R of the highly doped p+ zone and of the electrode 9 respectively. In order to achieve that the breakdown current following onset in region I, spreads immediately over the entire cross section of the active semiconductor part provided for current conduction, the voltage drop $\Delta U = \Delta U_m$ with a breakdown current in region I at which there is positively no destruction of semiconductor material, must be equal to or greater than the above mentioned difference $\Delta U_D$ of the breakdown voltages.

The mechanism of the current distribution in the semiconductor element in an avalanche breakdown situation is particularly clearly represented in the equivalent circuit diagram depicted in FIG. 2. There it will be seen that diode 13 having breakdown voltage $U_{D1}$ corresponds to region I of the active semiconductor part. A current flowing over this diode in the amount of a certain admissible breakdown current $J_m$ produces in resistance 14 — which corresponds to zone 12 of the active semiconductor part — a voltage drop $\Delta U_m$. Parallel to the series connection which is established by diode 13 and resistance 14, is arranged a second diode 15 with a breakdown voltage $\Delta U_{D2}$, which represents the active semiconductor part lying outside of region I. With a voltage drop $\Delta U_m = U_D = U_{D2} - U_{D1}$, the condition for an avalanche breakdown in both diodes 13, 15, hence in all regions of the active semiconductor part, is satisfied.

The following considerations lead to dimensioning of radius $R$ which is equal to one-half the internal diameter of the annular electrode 9 that also coincides with the inner diameter of the annular highly doped n+ zone 6, the distance $d$ between the upper end surface of the semiconductor disc 1 in contact with the undersurface of annular electrode 9 and the upper boundary 11 of the space charge zone existing substantially at avalanche breakdown, and the edge of region I with radius $r$ is proportional to a quantity $k = (1/d) \log_e (R/r)$. The desired resistance can thus be achieved with a given $r$ by varying $d$ and $R$. Tests have shown that for most practical cases, and with use of silicon as the semiconductor material, and aluminum as an acceptor substance, the quantity lies within the limits $40 < k < 1{,}000\ cm^{-1}$.

We claim:

1. A shock voltage-resistant two electrode semiconductor diode which consists of a disc of semiconductor material including a p-n junction therein, a first one of said electrodes contacting one face of said semiconductor disc, and the second one of said electrodes contacting the opposite face of said semiconductor disc, said second electrode having an annular configuration and being adjacent a highly doped zone of the same configuration, said annular second electrode also being concentrically located with respect to a circularly configured central region of said disc in which the specific resistance of the semiconductor matrrial has a value lower than that of the remainder of the disc and where avalanche breakdown is started, the radius $R$ of the inner periphery of said annular second electrode, the radius $r$ of said central region of said disc, and the distance $d$ between the end face of said semiconductor disc in contact with the surface of said annular second electrode and the adjacent boundary of the space charge zone existing within said semiconductor disc substantially at avalanche breakdown bearing a relationship such that $\log_e(R/r) = kd$, wherein $k$ is a constant.

2. A shock voltage-resistant semiconductor diode as defined in claim 1 wherein the semiconductor material forming said disc is silicon, wherein aluminum serves as an acceptor substance, and wherein the constant $k$ lies within the limits $40 < k < 1{,}000\ cm^{-1}$.

* * * * *